July 14, 1925.
L. M. SPENCER
1,546,261
BODY DUMPING MECHANISM
Original Filed Aug. 29, 1918   4 Sheets-Sheet 1
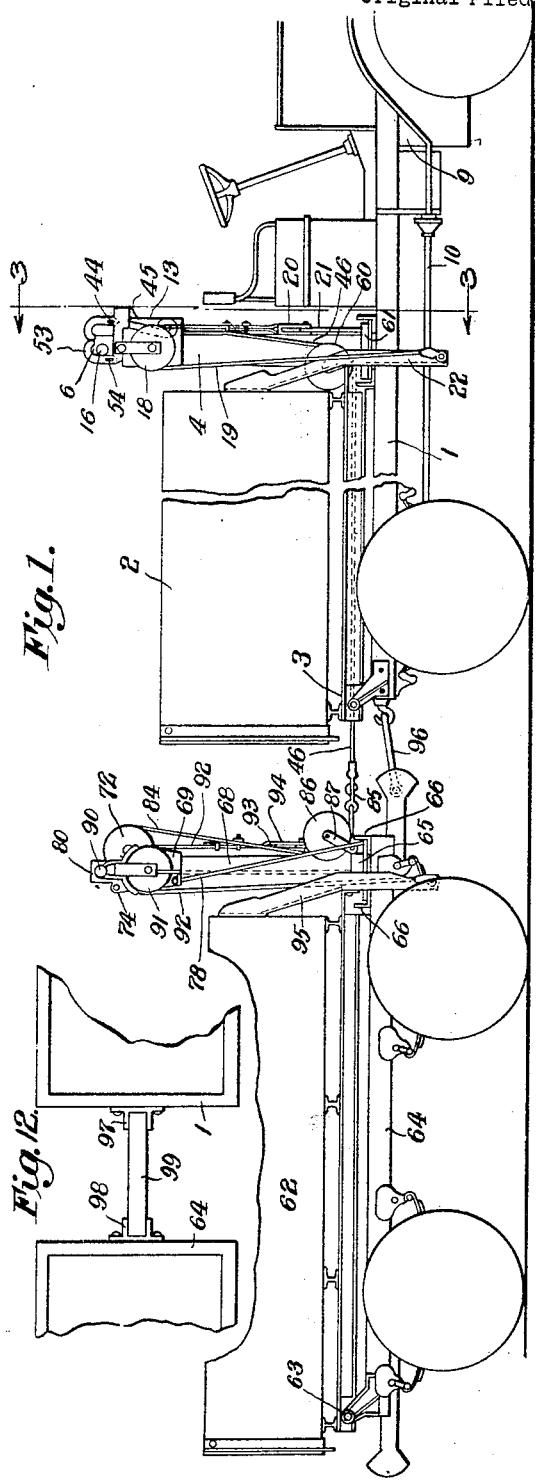
Inventor:
Louis M. Spencer July 14, 1925.
L. M. SPENCER
BODY DUMPING MECHANISM
Original Filed Aug. 29, 1918     4 Sheets-Sheet 2
1,546,261
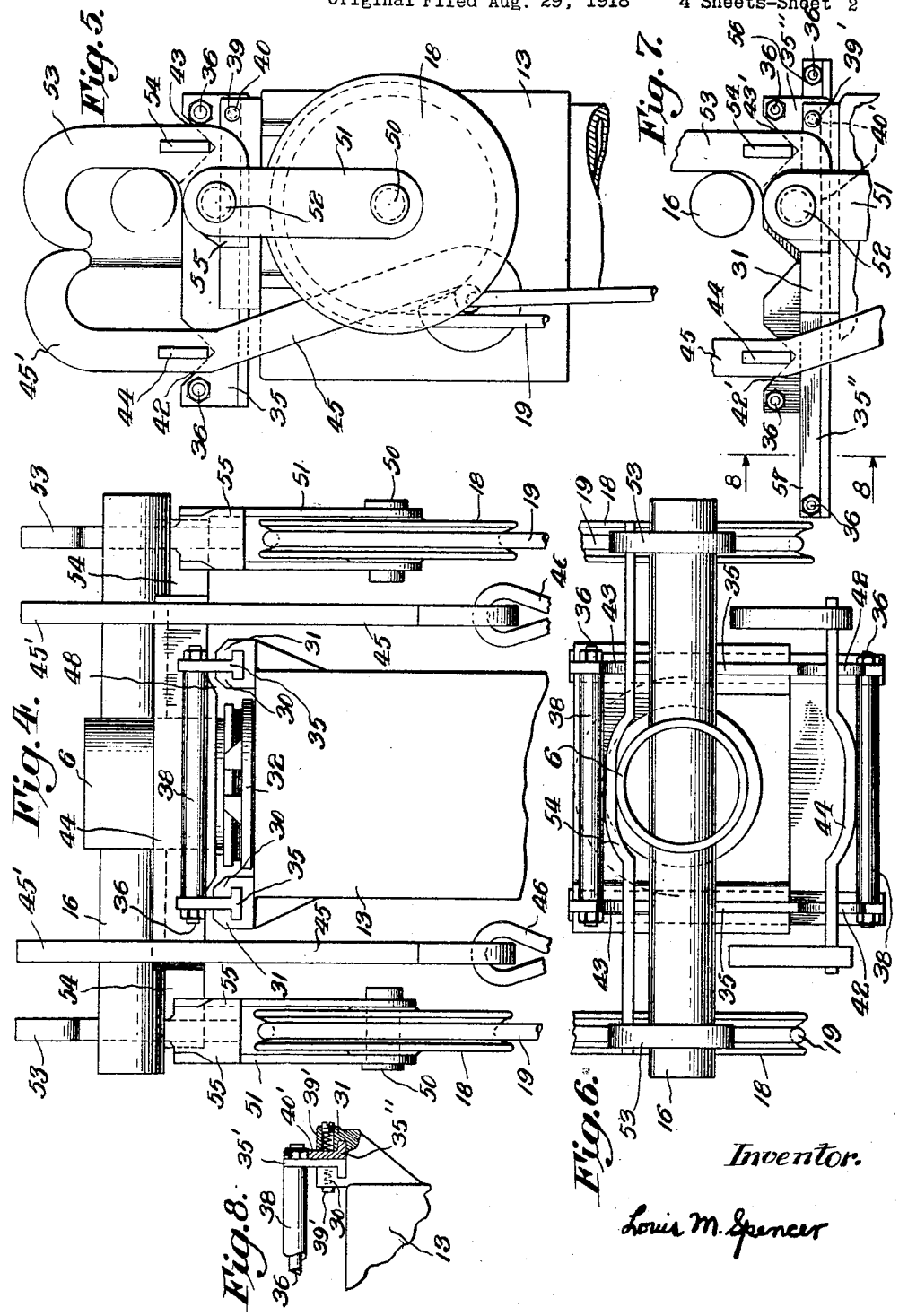
Inventor.
Louis M. Spencer

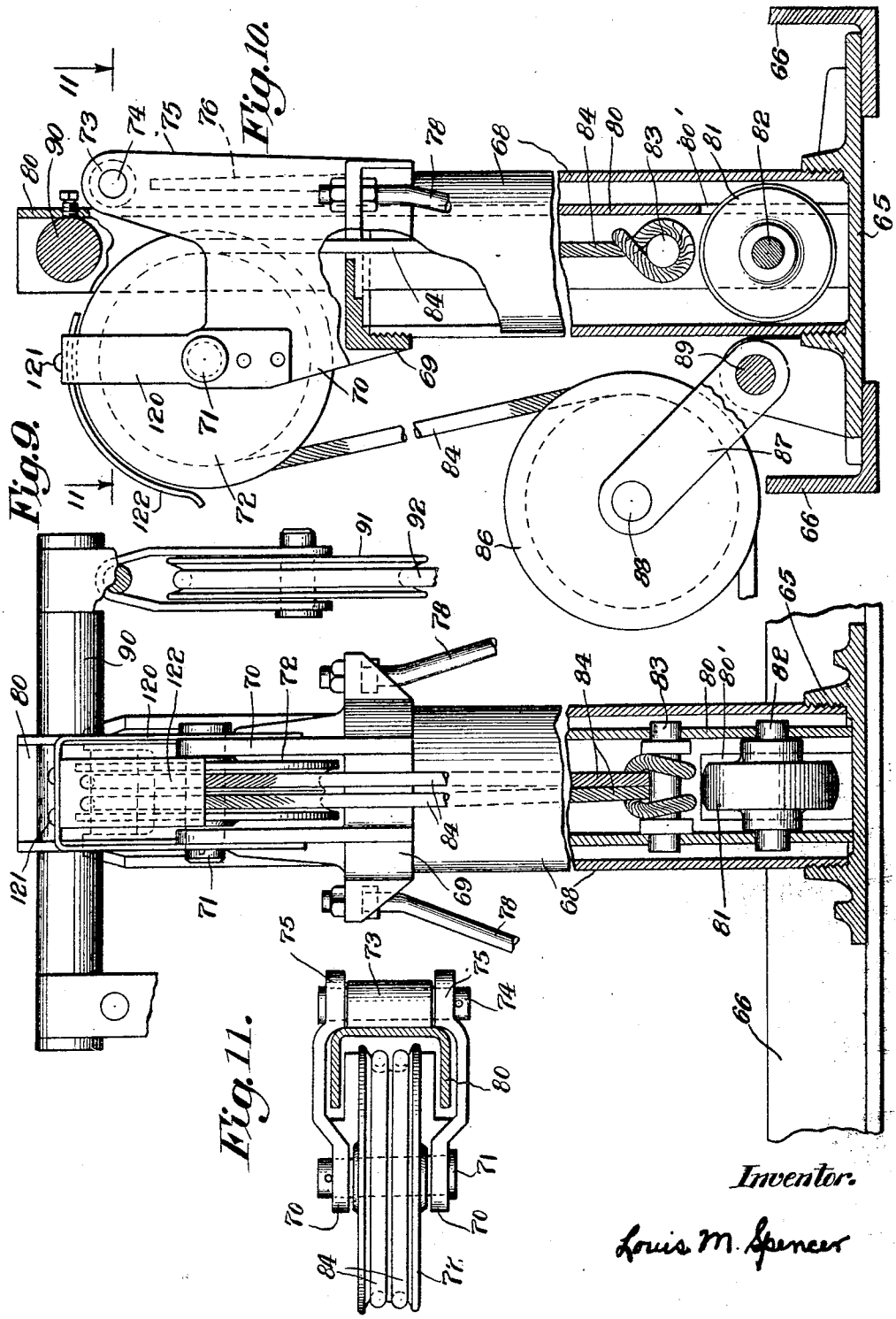

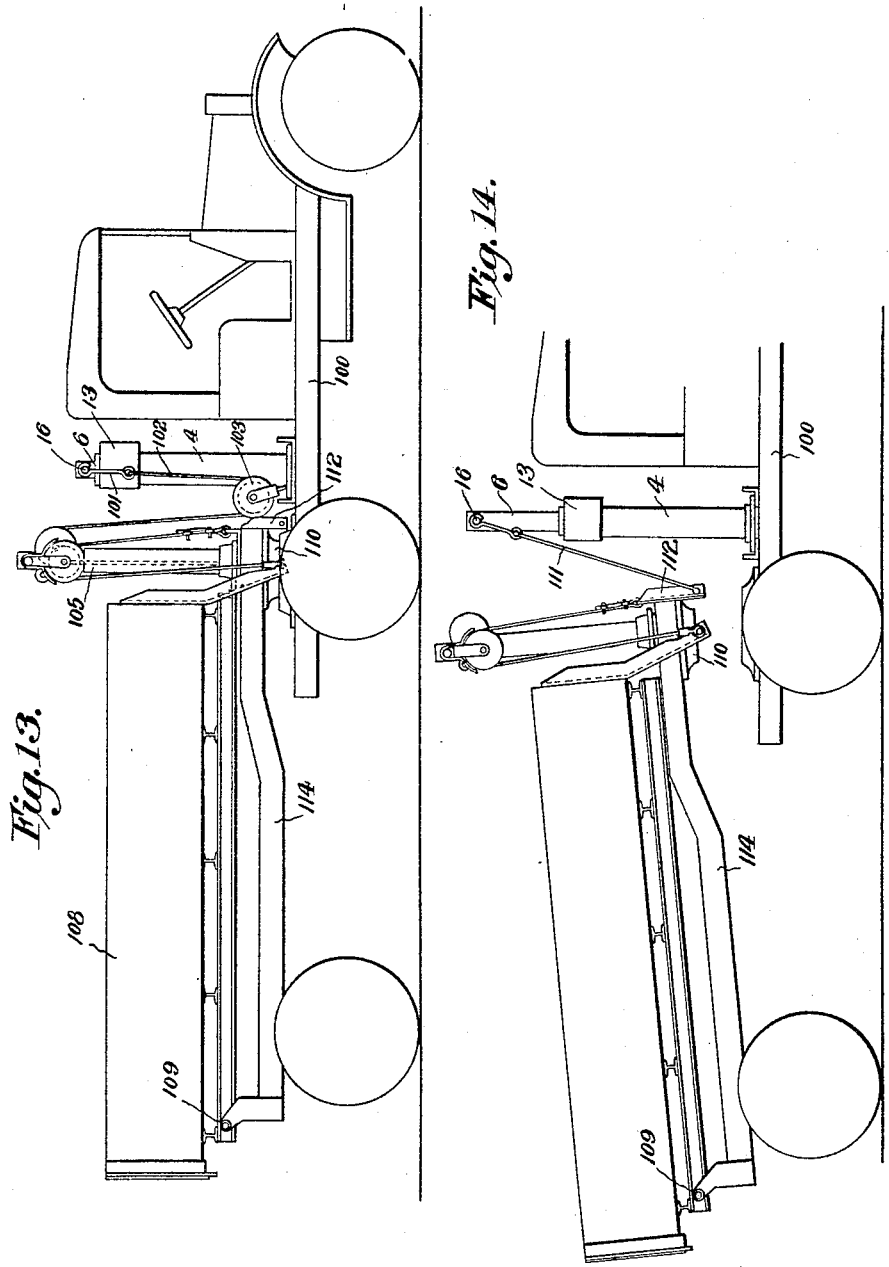

Patented July 14, 1925.

1,546,261

UNITED STATES PATENT OFFICE.

LOUIS M. SPENCER, OF HIGHLAND PARK, MICHIGAN.

BODY-DUMPING MECHANISM.

Original application filed August 29, 1918, Serial No. 251,907. Divided and this application filed July 28, 1922, Serial No. 578,344. Renewed January 10, 1925.

*To all whom it may concern:*

Be it known that I, LOUIS M. SPENCER, a citizen of the United States, and a resident of Highland Park, county of Wayne, and State of Michigan, have invented certain new and useful Improvements in Body-Dumping Mechanism, of which the following is a full, clear, concise, and exact description, such as will enable others skilled in the art to which the invention relates to make and use the same, reference being made therein to the accompanying drawings, which form a part of this specification The present application is a division of my application S. N. 251,907, filed August 29, 1918, and relates to mechanism for tilting vehicle bodies.

In the drawings, Fig. 1 is a side view showing a preferred embodiment of the invention. Fig. 2 is a plan view corresponding thereto, parts being broken away and the trailer body being omitted. Fig. 3 is a section on about the line 3—3 of Fig. 1, showing the general arrangement of the pump and associated parts, which, for sake of clearness, are omitted in Figs. 1 and 2. Fig. 4 is a similar enlarged fragmentary view of the upper end portion of the unit. Figs. 5 and 6 are a side view and a plan view, respectively corresponding to Fig. 4. Figs. 7 and 8 are fragmentary views corresponding to Figs. 4 and 5 and showing a modification wherein the different connections are independently made. Fig. 9 is an enlarged fragmentary front view of the hoisting mechanism on the trailer. Fig. 10 is a side view corresponding thereto, parts being broken away. Fig. 11 is a section on the line 11—11 of Fig. 10, the sheave guard being removed. Fig. 12 is a fragmentary plan view showing the spacer bar for holding the trailer spaced from the truck, the draw bar being omitted. Fig. 13 is a side view showing the application of the mechanism which appears in Figs. 9, 10 and 11 to a two-wheeled trailer. Fig. 14 shows the manner of lifting the trailer frame from the pulling vehicle.

The truck, as indicated in Fig. 1, includes the frame 1, the body 2 tiltable thereon about the pivots 3, and the upstanding hydraulic cylinder 4 which contains a piston, not shown, and has the piston rod 6 projecting therefrom. A pump 8, driven from the propelling engine 9, as by the shaft 10 and chain 11, Fig. 3, draws oil through the suction pipe 12 from the expansion chamber 13 and the upper end of the cylinder and expels it through the pressure pipe 14 back into the cylinder below the piston, thus causing the latter to rise. The piston rod 6 is provided with a cross arm or head 16. The construction thus far described is well known as is the association therewith of a pair of pulleys 18, cables 19, equalizing bar 20, anchor strap 21 and body arms 22 whereby the piston rod tilts the truck body. However, the pulleys have heretofore in practice been permanently attached to the cross arm whereas in the present instance they are readily detachable therefrom as pointed out later.

Supported on the expansion tank or the upper end of the cylinder in any suitable way as, for example, by means of the guide flanges 30—31 with which the tank or the cylinder head 32 may be provided, are a pair of plates 35 which may be slid forward and back under the cross arm or head. These plates 35 are joined at their front and rear ends to form a chair or support by bolts 36 that pass through tubular spacers 38. Any suitable means, for instance, a spring pressed plunger 39, Fig. 5, adapted to be received in either of the holes 40 in one of the plates 35, serves to retain the support at one limit or the other of its movement against accidental displacement but permits it to be shifted easily by a driver grasping the front spacer 38 and pulling forwardly or pushing backwardly thereon as the case may be. I am aware, as suggested above, that the plates may be supported for movement relative to the piston rod in various ways other than that shown. The plates are preferably each provided in their upper surfaces with a front notch 42 and a rear notch 43.

Arranged to be received in the notches 42 is a cross bar 44 the central portion of which is curved to clear the piston rod (Fig. 6) and the ends of which are preferably welded in slots in the hooks or hook bars 45 to the lower ends of which cables 46 are attached. The lower surface of the cross bar 44 is inclined between the plates 35 as indicated at 48, Fig. 4, from which it follows that the hook bars are normally maintained symmetrically disposed with reference to the longitudinal central vertical plane of the cylinder; and the position of the notches 42 is such that the hooks 45' at the upper ends of the bars 45 are centrally above the cross arm 16 when the chair is at its rearward limit of movement whereas, when the chair is at its limit of movement forwardly (Fig. 5), the hooks 45' are out of the path of the cross arm.

In like manner, the pivot pins 50 of the pulleys 18 are hung in straps 51 that are themselves pivoted at 52 to hooks 53, and the latter are joined by a cross bar 54 which is, except in matter of length, the counterpart of the cross bar 44. The bar 54, as will be readily understood, is adapted to rest in the notches 43; when in the position shown in Fig. 5, the hooks 53 are in the path of the cross arm and will be picked up or caught and elevated thereby; however, when the chair is at the limit of its movement rearwardly, they are out of the way. Were no means provided to prevent it, the weight of the pulleys and associated parts would tend to swing the hooks 53 counterclockwise (Fig. 5) in the notches 43 back into the path of the cross arm—the hooks are therefore provided with lugs 55 that lie in the planes of the straps 51 below the center lines of the pins 52. The same thing may be accomplished in other ways, for example, the straps may be made integral with the hooks but the construction shown is preferred since it lends itself readily to commercial processes of manufacture.

To repeat:—When the parts are in the position shown (Fig. 5), the hooks 53 will be caught by the rising cross arm and the truck body tilted, whereas when the chair is shifted backwardly the hooks 45—45' will in turn be lifted. The reverse arrangement would be less desirable since the hooks 45 might be in the way of the rising truck body. Moreover, the jarring of the vehicle, acting through the surfaces 48 and the upper surfaces of the notches 42—43, automatically tends to center both sets of hooks properly with reference to the vertical longitudinal plane of the vehicle which includes the center line of the piston.

It is evident that the hooks 45—45' might be replaced by a second pair of hooks and pulleys the counterpart of the elements 18—53 and that the latter might likewise be replaced by a second pair of hooks 45—45'. In any event, the chair is held in one of its limiting positions and gravity maintains the pairs of hooks always properly positioned, both longitudinally and transversely, on the chair so that the stresses in the piston rod are minimized and, for the most part, in direct compression.

As indicated in Figs. 7 and 8, the two sets of hooks may be independently operated by using in lieu of each plate 35 a pair of plates 35' and 35", and by cutting away the upper rear portions of the former and the upper front portions of the latter at 56 and 57, respectively, to provide clearance for the hook cross bars when the latter are resting in the notches 42' and 43'. Two retaining elements 39'—40' which may be the same in construction as the parts 39—40, are of course, provided. The piston rod may thus be made to simultaneously pull both sets of cables, or may be freed from both, and used for other purposes if desired, or may be used to actuate either set at will. It will also be understood that in some instances it may be necessary to employ but one shiftable set, the other cables being actuated whenever the piston rod is projected.

In the embodiment of the invention shown in Figs. 1 and 2, the cables 46 pass down through pulleys 60 on the base 61 of the hoist and thence rearwardly to the four wheeled trailer. While the means for utilizing the cables to tilt the trailer body 62 about the pivots 63 on the frame 64 is subject to wide variation, it is preferred to employ the mechanism shown, since it not only provides for low clearance and high tilting but also requires very few accurate machining operations. This mechanism includes a base 65 mounted on cross bars 66 and having threaded therein an upstanding pipe 68 which is, in turn, threaded into a head 69 that includes in its front portion the ears 70 between which the shaft 71 of the double pulley 72 is mounted. At the rear the head is provided with a roller 73 mounted on the shaft 74 that is carried in ears 75 joined and braced by the web 76. These parts, which may be manufactured with very little machine work, constitute a guide that is preferably braced by the laterally and forwardly diverging tension rods 78 which preferably extend to the outer ends of the front cross bar 66.

Reciprocable in the guide is a thrust bar 80, preferably formed of a pressed metal channel having its web cut away at its lower end at 80' to allow clearance for the spherically faced roller 81 that turns on a shaft 82 bearing in the flanges of the thrust bar. The diameter of the roller is slightly less than the inner diameter of pipe 68. Just above the roller is a cross pin 83 to which the cable 84 that is detachably connected to the cables 46 in any suitable way—say at the point 85, this connection being omitted in Fig. 2—is anchored, for example, by forming it in a single run and looping it about the pin. In the embodiment shown both strands of the cable 84 pass around a double pulley 86 which is pivotally secured to the base 65 by the links 87 and pins 88—89;

and the cable is prevented from leaving the pulley 72 by means of a guard which is formed of a transverse strap 120 mounted on the ears 70 and riveted or welded at 121 to the circumferentially extending element 122. The upper end portion of the thrust bar bears at its rear side on the roller 73 or at its front side (of the web portion) on the face of the pulley 72, depending on which way it may tend to swing, thus minimizing friction and at the same time bracing the thrust bar at a point substantially at the top of the guide. The clearance between the roller 73, the pulley 72, and the thrust bar being small, and the distance from the roller shaft 82 to the shaft 74 being relatively great, even when the thrust bar is in its uppermost position, the motion of the thrust bar is substantially rectilinear.

The connection between the thrust bar and the body may be varied; as shown, it comprises a cross arm 90, pulleys 91, cables 92, equalizer 93, anchor strap 94 and body arms 95, which may be duplicates, respectively, of the parts 16, 18, 19, 20, 21 and 22 heretofore described.

For the purpose of relieving the drawbar 96 of thrust when the trailer body is being dumped, the rear cross bar of the truck frame and the front cross bar of the trailer frame may be provided with brackets 97 and 98 between which the spacer bar 99 of any suitable construction, say a pipe section, is supported at such times—see Fig. 12. The drawbar might, of course, be of the thrust receiving type, as shown and claimed in my above identified application.

Certain features of the invention are applicable advantageously to that type of trailer known as the "semi-trailer"—Figs. 13 and 14. In this case, the cylinder 4, piston rod 6, together with the associated pump and related mechanism (not shown, but preferably the same as heretofore described) are carried on the tractor frame 100. The hooks 101 alone are used and the cables 102 that correspond to the cables 46, lead rearwardly through pulleys 103, which correspond to the pulleys 60, to certain mechanism indicated as a whole by 105 and corresponding in construction to those parts previously described as positioned on the four wheel trailer, whereby the body 108 may be tilted about the pivots 109 as before. It is desirable that the mechanism 105 be positioned with the axis of the tubing or pipe substantially in alignment with that of the fifth wheel or pivot 110 thus minimizing the tendency to tension the cables 102 as the trailer swings. By providing a little slack in the cables, all necessary relative movements may be permitted.

By disconnecting the cables 102 (which may be accomplished by disconnecting the pulleys 103, or in any other preferred manner) and connecting cables 111 between the cross bar 16 and a suitable anchorage or anchorages 112 on the front end of the trailer frame 114, the latter may be elevated as shown in Fig. 14 to allow the insertion of a suitable support (not shown), so that either one of a plurality of the trailers may be used with a single pulling vehicle as in common practice with such vehicles.

One main advantage in mounting the hoisting cylinder on the tractor, as distinguished from semi-trailer constructions heretofore used wherein the cylinder is mounted on the semi-trailer frame, resides in the ease with which the connections between the pump and the cylinder may be maintained, it being understood that the pressures are necessarily so high as to make it a matter of great difficulty to prevent leakage when the cylinder is on the trailer frame and the pump on the tractor. The present construction is also advantageous over installations in which both pump and cylinder might be mounted on the trailer frame, since it would then be difficult, if not impractical, to drive the pump from the propelling engine.

It is evident that the construction of the hook attaching and detaching mechanism may be modified within wide limits without departing from the spirit of the invention; and it is again pointed out that this mechanism may be used for many purposes additional to or other than the tilting of trailer bodies, such, for example, as the hoisting or dragging of loads into the vehicle, or the operation of loading skips external to the vehicle and the like. The invention is also applicable to horizontal cylinders and cable hauling mechanism as well as to the vertical or upright type. I do not, therefore, wish to be limited except as indicated by the subjoined claims.

I claim:
1. A vehicle comprising a frame, a body pivoted thereon to tilt, an upstanding guide mounted on the frame forwardly of the body, said guide including a base, a tubular member connected to the base by threading, a head also connected to the tubular member by threading, a thrust bar of substantially U-shape in cross section reciprocable in the guide, a sheave mounted on the head and extending into the channel of the thrust bar, a roller carried by the head on the side of the thrust bar opposite from the sheave, a cable passing over the sheave and attached to the lower end portion of the thrust bar for elevating the latter, and means whereby the body is tilted as the thrust bar rises.

2. A vehicle comprising a frame, a body pivoted thereon to tilt, an upstanding guide mounted on the frame, said guide including a tubular body, a thrust bar reciprocable in the body, said thrust bar having a slot in its lower end portion, a roller rotatable in the slot, a cable attached to the lower end portion of the thrust bar for elevating the latter, and means whereby the body is tilted as the thrust bar rises.

3. A vehicle comprising a tiltable body, an upstanding guide adjacent thereto, said guide comprising a base, a head, and a pipe section connecting the base to the head, a thrust bar reciprocable in the body, said thrust bar being slotted in its lower end portion, and a roller rotatable in the slot and having a substantially spherical surface of approximately the same diameter as the inner diameter of the pipe section, a roller and a sheave carried by the head and rotatable about parallel axes, said thrust bar passing through between the roller and the sheave and being adapted to bear on either the roller or the sheave, a cable passing over the sheave and anchored to the lower end portion of the thrust bar, and means whereby the body is tilted as the thrust bar rises.

4. In a dumping vehicle, a tiltable body, an upstanding guide adjacent said body, a thrust bar substantially U-shaped in cross-section reciprocable therein, means associated with the upper end of the bar for tilting the body as the bar rises, a sheave carried by the upper end portion of the guide, a cross-pin passing transversely through the lower end of the bar, a cable passing over the sheave and being looped around the cross-pin for lifting the latter, and a roller carried by the bar below the cross-pin and co-acting with the guide to steady the bar and reduce friction.

5. In a dumping vehicle, a tiltable body, an upstanding guide forwardly of said body, a thrust bar reciprocable therein, a sheave mounted on the upper portion of the guide, a second sheave near the base of the guide, a link pivotally connected to the guide and carrying a pin about the axis of which the second sheave is rotatable, a cable passing over the first sheave and under the second sheave and anchored to the lower end of the thrust bar whereby the latter may be elevated, and means associated with the upper end of the bar for tilting the body as the bar rises.

6. In a dumping vehicle, a tiltable body, an upstanding guide, a thrust bar reciprocable therein, means for tilting the body as the bar rises, the guide including a head, a rotatable sheave carried by the head, a cable passing over the sheave and attached to the lower end of the bar to elevate the latter, a cable guard for the sheave carried by the head, said guard including a strap of metal bent to approximately conform to the circumference of the sheave for a considerable angular distance, and a second metal strap secured to the first strap and including end portions extending inwardly from the circumference of the sheave and fixed to the head.

7. A vehicle including a tractor frame, a semi-trailer frame having its front end carried by the tractor frame, said semi-trailer frame being swingable in respect to the tractor frame about a vertical axis, a body carried by the semi-trailer frame and tiltable about a horizontal axis near the rear end thereof, an upstanding guide mounted on the semi-trailer frame forwardly of the body, a thrust bar reciprocable therein, cable means actuated by the thrust bar for lifting the front end of the body as the thrust bar rises, cable hauling mechanism carried by the tractor frame and cable means actuated by the cable hauling mechanism for lifting the thrust bar to thereby tilt the body.

8. A vehicle including a tractor, a semi-trailer having its front end supported by the tractor and swingable in respect thereto about a substantially vertical axis, said semi-trailer including a frame and a body pivoted thereon to tilt, an upstanding guide mounted on said frame forwardly of the body and substantially in line with said axis, a thrust bar reciprocable therein, cable means actuated by the thrust bar for lifting the front end of the body at substantially twice the speed at which said thrust bar rises, cable hauling mechanism carried by the tractor, and cable means actuated by the cable hauling mechanism for lifting the thrust bar.

9. A self-propelled vehicle including a tractor, a semi-trailer having its front end supported by the tractor and swingable in respect thereto about a substantially vertical axis, said semi-trailer including a frame and a body tiltable about a transverse horizontal axis near the rear end of said frame, an upstanding hydraulic jack carried by the tractor forwardly of the semi-trailer frame, and means whereby said jack may be utilized to either tilt the body in respect to the frame or to lift the latter free and clear from engagement with the tractor.

10. In combination, a steerable wheeled vehicle having a propelling engine and a supporting member, a wheeled frame having its front end supported by said member to swing horizontally relatively thereto, and means carried by said vehicle and operated by the engine thereof for lifting the front end of said frame from said member.

11. In combination with a steerable wheeled frame having thereon a propelling engine, an upright hoist mounted on said frame and actuated by said engine, a swingable wheeled frame having its front end resting on said first named frame, a body tiltable on said second named frame, and connections whereby said hoist may be utilized to tilt said body or to lift the front end of said second frame with reference to said first frame at will.

12. In combination, a tractor including a propelling engine, a wheeled frame having its front end normally supported by said tractor, a device operable by said engine and carried by said tractor and interposed between it and said frame to elevate the latter from said tractor.

13. In combination with a pulling vehicle having a propelling engine, a swingable wheeled frame having its front end resting on said vehicle, a body carried by said frame and tiltable in respect thereto, and means whereby said engine may be utilized to tilt said body or to lift the front end of said frame relatively to said vehicle at will.

14. In combination with a tractor, a wheeled frame having its front end supported by said tractor by a fifth wheel structure, the upper part of which is attached to said frame, hoisting means carried by said tractor and actuated by the engine of said tractor for lifting the front end of said frame and said upper part of the fifth wheel structure from said tractor and from the rest of said fifth wheel structure.

In testimony whereof I affix my signature.

LOUIS M. SPENCER.